United States Patent
Oyama

(10) Patent No.: US 10,137,884 B2
(45) Date of Patent: Nov. 27, 2018

(54) CONTROL APPARATUS OF HYBRID VEHICLE

(71) Applicant: Toyota Jidosha Kabushiki Kaisha, Toyota-shi, Aichi-ken (JP)

(72) Inventor: Shunsuke Oyama, Nagakute (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 29 days.

(21) Appl. No.: 15/160,543

(22) Filed: May 20, 2016

(65) Prior Publication Data

US 2016/0347306 A1 Dec. 1, 2016

(30) Foreign Application Priority Data

May 29, 2015 (JP) .................. 2015-109671

(51) Int. Cl.
*B60W 20/17* (2016.01)
*B60K 6/445* (2007.10)
(Continued)

(52) U.S. Cl.
CPC ............ *B60W 20/17* (2016.01); *B60K 6/24* (2013.01); *B60K 6/26* (2013.01); *B60K 6/445* (2013.01); *B60L 15/20* (2013.01); *B60W 10/08* (2013.01); *B60W 20/00* (2013.01); *B60W 2420/54* (2013.01); *B60W 2710/083* (2013.01);
(Continued)

(58) Field of Classification Search
None
See application file for complete search history.

(56) References Cited

U.S. PATENT DOCUMENTS

2008/0122391 A1    5/2008   Iwase et al.
2012/0029748 A1    2/2012   Kozarekar et al.
(Continued)

FOREIGN PATENT DOCUMENTS

| JP | 2008-143348 A | 6/2008 |
|----|---------------|--------|
| JP | 2013-203388 A | 10/2013 |
| WO | 2014091582 A1 | 6/2014 |

OTHER PUBLICATIONS

Office Action dated Apr. 20, 2018 in U.S. Appl. No. 15/160,534, filed May 20, 2016.
(Continued)

*Primary Examiner* — Musaa A Shaawat
*Assistant Examiner* — Kyung J Kim
(74) *Attorney, Agent, or Firm* — Dinsmore & Shohl LLP

(57) ABSTRACT

A control apparatus of a hybrid vehicle has an abnormal sound generation condition determination unit that determines whether or not an abnormal sound generation condition of a gear train is satisfied, and a pressing processor that applies a pressing torque from a first rotary electric machine to the gear train when a retention time, which is a period in which the abnormal sound generation condition continues to be satisfied, exceeds a predetermined value, and that does not apply the pressing torque when the abnormal sound generation condition is not satisfied and when the retention time is within the predetermined value. A pressing torque setting unit sets a pressing torque to be applied by the first rotary electric machine to a direction to suppress an engine cam torque which may rotate an engine output shaft.

6 Claims, 5 Drawing Sheets

(51) Int. Cl.
*B60K 6/26* (2007.10)
*B60L 15/20* (2006.01)
*B60K 6/24* (2007.10)
*B60W 10/08* (2006.01)
*B60W 20/00* (2016.01)

(52) U.S. Cl.
CPC ..... *B60Y 2200/92* (2013.01); *B60Y 2300/205* (2013.01); *Y02T 10/6239* (2013.01); *Y02T 10/7258* (2013.01); *Y10S 903/905* (2013.01); *Y10S 903/906* (2013.01)

(56) References Cited

U.S. PATENT DOCUMENTS

2013/0297180 A1* 11/2013 Ando .................. B60K 6/445
　　　　　　　　　　　　　　　　　　　　　701/102
2015/0367832 A1    12/2015 Oshiumi

OTHER PUBLICATIONS

Notice of Allowance dated Sep. 24, 2018 in in U.S. Appl. No. 15/160,534, filed May 20, 2016.

* cited by examiner

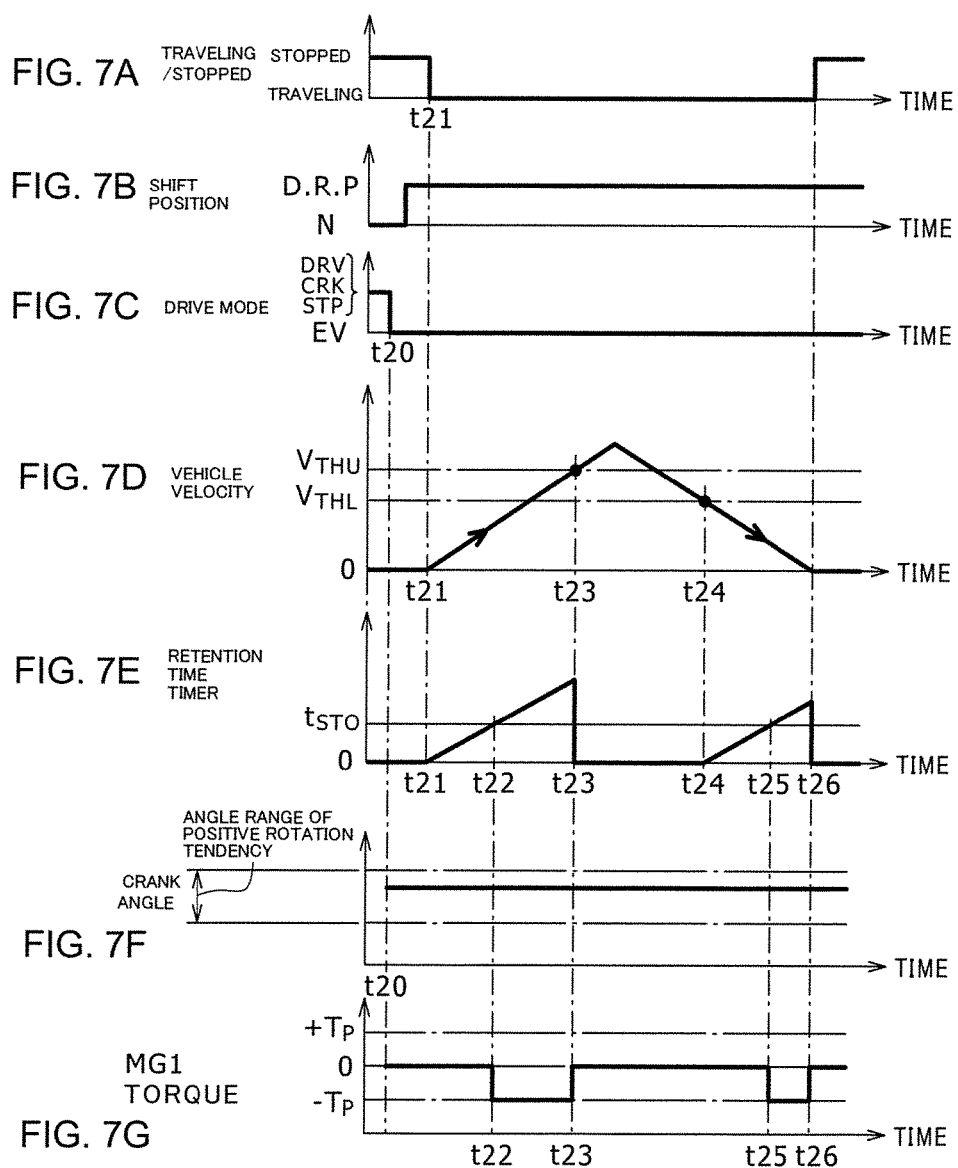

US 10,137,884 B2

CONTROL APPARATUS OF HYBRID VEHICLE

PRIORITY INFORMATION

This application claims priority to Japanese Patent Application No. 2015-109671, filed on May 29, 2015, which is incorporated herein by reference in its entirety.

BACKGROUND

Technical Field

The present disclosure relates to a control apparatus of a hybrid vehicle, and in particular to a control apparatus of a hybrid vehicle that executes suppression of an abnormal sound of a gear train in a hybrid vehicle in which an engine, a first rotary electric machine, and a second rotary electric machine are connected to each other through a transmission mechanism having the gear train.

Related Art

As a technique related to the present disclosure, US Patent Application Publication No. 2012/0029748 discloses that, in a hybrid vehicle having an engine, a power generator, and a motor, when the engine is stopped and the vehicle travels solely using the motor, as the vehicle velocity becomes high, a rotational speed becomes high in a no-load state of the power generator, resulting in degradation of a pinion of a planetary gear mechanism which is a motive power conversion mechanism. Here, a small bias torque in a degree of a frictional torque of the engine is applied from the power generator to the pinion of the planetary gear mechanism.

In a hybrid vehicle in which an engine, a first rotary electric machine, and a second rotary electric machine are connected to each other through a transmission mechanism including a gear train, if there is rattling in the gear train, depending on the drive state of the hybrid vehicle, rattling noise or the like may occur in the gear train, which when it continues to occur, becomes an abnormal sound uncomfortable for the user. As described in US Patent Application Publication No. 2012/0029748, when a pressing torque which is a bias torque is applied from the first rotary electric machine which is a power generator to the gear train during a period in which the engine is stopped, the rattling of the gear train is reduced, and generation of abnormal sound during a period in which the engine is stopped can be suppressed. In this case, depending on the manner of application of the pressing torque, a crank angle of the engine which is stopped may be moved. Because the crank angle of the engine is strongly correlated to a shock at the time of starting the engine, when the crank angle of the engine is moved, the shock during starting of the engine may be worsened.

An advantage of the present disclosure is in the provision of a control apparatus of a hybrid vehicle which can suppress movement of the crank angle of the engine while suppressing generation of an abnormal sound of the gear train which is uncomfortable for the user.

SUMMARY

According to one aspect of the present disclosure, there is provided a control apparatus of a hybrid vehicle in which an engine, a first rotary electric machine, and a second rotary electric machine are connected to each other through a transmission mechanism including a gear train, the control apparatus configured to: determine whether or not a drive state of the hybrid vehicle satisfies an abnormal sound generation condition of the gear train; and execute a pressing process to apply a pressing torque for reducing rattling from the first rotary electric machine to the gear train of the transmission mechanism when a predetermined condition is satisfied, and to not apply the pressing torque when the predetermined condition is not satisfied, wherein the predetermined condition includes the abnormal sound generation condition and a condition that a retention time, which is a period in which the abnormal sound generation condition continues to be satisfied, exceeds a predetermined value.

According to another aspect of the present disclosure, in the control apparatus of the hybrid vehicle, the pressing torque may be a torque in a direction to suppress an engine cam torque which may rotate an engine output shaft during a period in which the engine is stopped.

According to another aspect of the present disclosure, in the control apparatus of the hybrid vehicle, the abnormal sound generation condition may include: a condition that a drive mode is an EV mode in which the engine is stopped and the vehicle travels solely using the second rotary electric machine; a condition that a vehicle velocity of the hybrid vehicle is lower than or equal to a predetermined velocity; a condition that the hybrid vehicle is traveling and is not stopped; and a condition that a shift position is at a shift position in which a torque is output to a drive wheel.

According to another aspect of the present disclosure, in the control apparatus of the hybrid vehicle, the vehicle velocity lower than or equal to the predetermined velocity may be a vehicle velocity lower than or equal to a predetermined acceleration velocity when the hybrid vehicle is accelerating, and is a vehicle velocity lower than or equal to a predetermined deceleration velocity which is lower than the predetermined acceleration velocity when the hybrid vehicle is decelerating.

ADVANTAGEOUS EFFECTS

According to a control apparatus of a hybrid vehicle of some aspects of the present disclosure, the pressing torque is applied from the first rotary electric machine to the gear train of the transmission mechanism only when an abnormal sound generation condition and a condition that a retention time, which is a period in which the abnormal sound generation condition continues to be satisfied, exceeds a predetermined value are both satisfied. When the pressing torque is not applied, the crank angle of the engine does not move. With such a configuration, it is possible to suppress movement of the crank angle of the engine while suppressing generation of the abnormal sound of the gear train which is uncomfortable for the user.

When the retention time in which the abnormal sound generation condition continues to be satisfied exceeds the predetermined value and the generation of the abnormal sound continues, the pressing torque is applied from the first rotary electric machine to the gear train. Depending on the manner of application, the crank angle of the engine may be moved. The crank angle moves in a period in which the engine is stopped because an external force greater than the frictional torque of the engine is applied. According to the above-described configuration, because the pressing torque is applied from the first rotary electric machine in a direction to suppress the engine cam torque which is a cause of the external force, the external force applied to the engine output shaft can be reduced, and the movement of the crank angle can be suppressed while suppressing generation of abnormal sound of the gear train.

In the control apparatus of the hybrid vehicle according to some aspects of the present disclosure, the abnormal sound generation condition may include a condition that a drive mode is an EV mode in which the engine is stopped and the vehicle travels solely using the second rotary electric machine, and a condition that the vehicle velocity of the hybrid vehicle is lower than or equal to a predetermined velocity. When the engine is operating, the engine sound is loud, and thus the user is not disturbed too much even when there is generation of abnormal sound of the gear train. In addition, when the vehicle velocity is high in the EV mode, a sun gear to which the first rotary electric machine is connected rotates at a high speed, and thus, even if abnormal sound of the gear train is generated, the engine output shaft is not moved in a certain direction. Based on these conditions, as the abnormal sound generation condition which may disturb the user, a condition is employed that the vehicle is in the EV mode and the vehicle velocity is low and lower than or equal to the predetermined velocity.

The abnormal sound generation condition may further include a condition that the hybrid vehicle is traveling and is not stopped, and a condition that a shift position is at a shift position where a torque is output to the drive wheel. In order for the first rotary electric machine to generate a pressing torque, torque generation is necessary. When torque is generated, the fuel consumption characteristic is consequently worsened. When the hybrid vehicle is stopped and no torque is generated, it can be considered that the possibility of generation of the abnormal sound of the gear train is also low. According to the above-described configuration, it is possible to avoid worsening of the fuel consumption characteristic, and suppress movement of the crank angle of the engine while suppressing the generation of the abnormal sound of the gear train.

According to a control apparatus of a hybrid vehicle of some aspects of the present disclosure, the vehicle velocity lower than or equal to the predetermined velocity is a vehicle velocity lower than or equal to a predetermined acceleration velocity when the hybrid vehicle is accelerating, and is a vehicle velocity lower than or equal to a predetermined deceleration velocity which is lower than the predetermined acceleration velocity when the hybrid vehicle is decelerating. By providing such a hysteresis characteristic, it becomes possible to stably execute low-velocity determination to determine whether or not the vehicle velocity is lower than the predetermined velocity.

BRIEF DESCRIPTION OF THE DRAWINGS

FIG. 7A is a diagram showing the procedure of FIG. 4 as a timing chart of a change of state of each element, and shows a change with respect to time of whether the vehicle is traveling or is stopped in an abnormal sound generation condition.

FIG. 7B is a diagram showing the procedure of FIG. 4 as a timing chart of a change of state of each element, and shows a change with respect to time of a shift position in an abnormal sound generation condition.

FIG. 7C is a diagram showing the procedure of FIG. 4 as a timing chart of a change of state of each element, and shows a change with respect to time of a drive mode in an abnormal sound generation condition.

FIG. 7D is a diagram showing the procedure of FIG. 4 as a timing chart of a change of state of each element, and shows a change with respect to time of a vehicle velocity in an abnormal sound generation condition.

FIG. 7E is a diagram showing the procedure of FIG. 4 as a timing chart of a change of state of each element, and shows a change with respect to time of a measurement value of a retention time timer which measures a period in which the abnormal sound generation condition continues to be satisfied.

FIG. 7F is a diagram showing the procedure of FIG. 4 as a timing chart of a change of state of each element, and shows a change with respect to time of a crank angle.

FIG. 7G is a diagram showing the procedure of FIG. 4 as a timing chart of a change of state of each element, and shows a change with respect to time of an MG1 torque which is an output torque of the first rotary electric machine.

DESCRIPTION OF EXEMPLARY EMBODIMENTS

Figure 1:
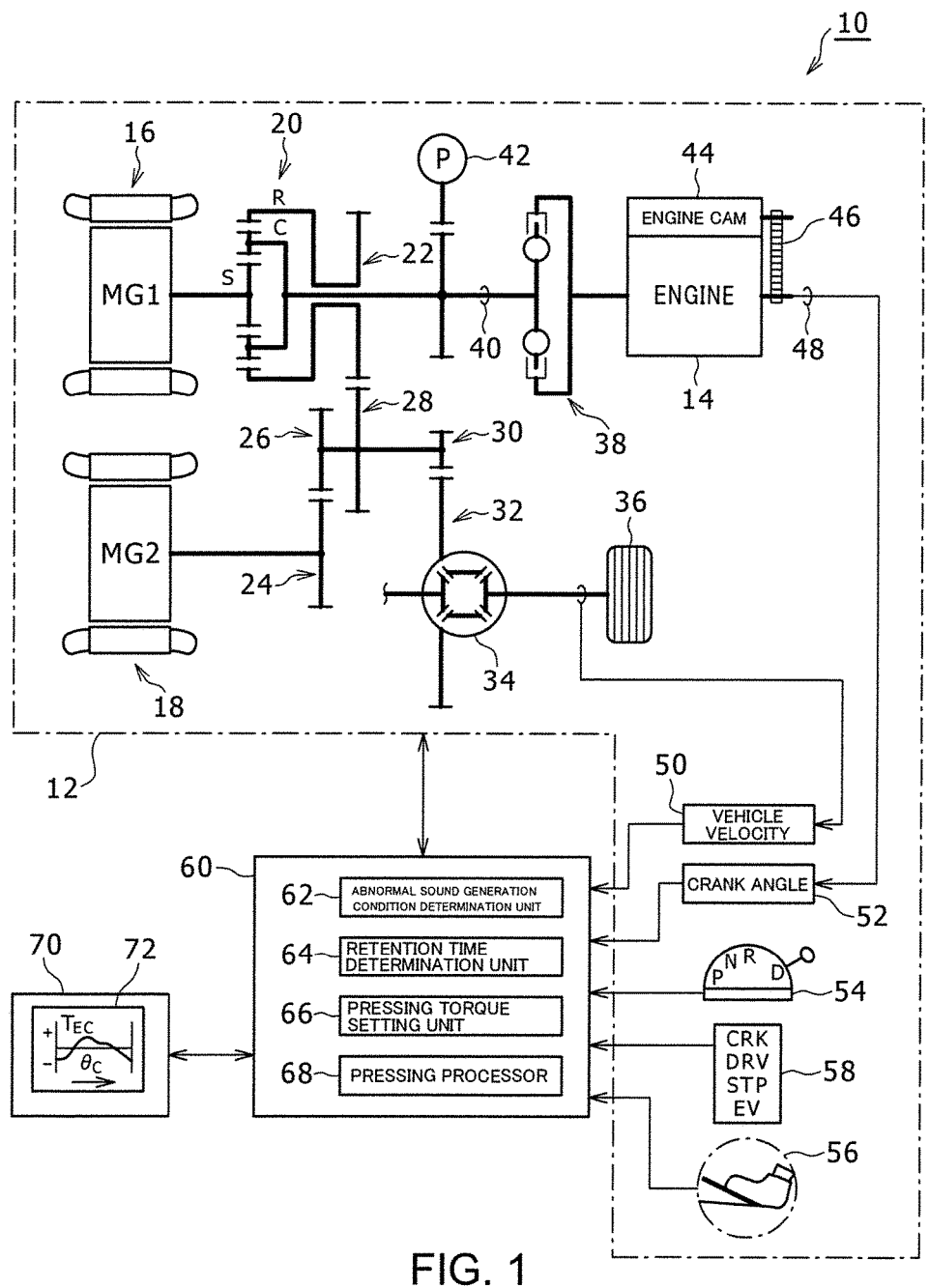
FIG. 1 is a structural diagram of a hybrid vehicle including a control apparatus according to an embodiment of the present disclosure.

An embodiment of the present disclosure will now be described in detail with reference to the drawings. In the following description, a hybrid vehicle having an engine and two rotary electric machine is described as the hybrid vehicle, but this description is merely exemplary of a basic structure of the hybrid vehicle, and alternatively, the number of rotary electric machines may be 3 or more. A four-cylinder type engine will be described as the engine, but this description is merely exemplary, and alternatively, an engine having a different number of cylinders may be used. In the following, a structure which uses a planetary gear mechanism as a motive power distribution mechanism is described, but this configuration is merely exemplary, and alternatively, a motive power distribution mechanism of a type other than the planetary gear mechanism may be used. Further, in the following, a multiple-axis type drive source in which a second rotary electric machine is placed on an axis different from that for the engine and a first rotary electric machine is described, but this is merely exemplary for description of control using a pressing torque of the second rotary electric machine for reducing rattling of the gear train, and in some cases, the drive source may be a single-axis type drive source.

In the following description, elements similar over all drawings are assigned the same reference numerals, and will not be repeatedly described.

Figure 2:
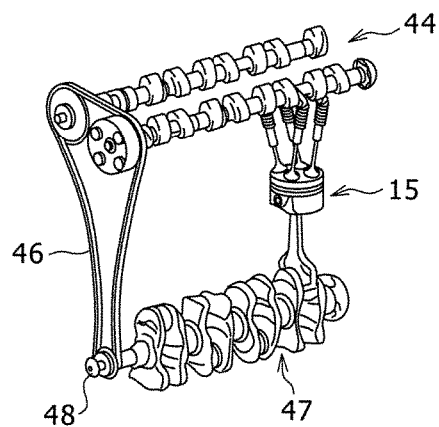
FIG. 2 is a structural diagram related to a crankshaft and an engine cam mechanism.

FIG. 1 is a diagram showing a structure of a hybrid vehicle 10. FIG. 2 is a structural diagram related to a crank shaft and an engine cam mechanism. As shown in FIG. 1, the hybrid vehicle 10 includes a vehicle body 12 and a control apparatus 60.

The vehicle body 12 has, as a drive source, an engine 14, a first rotary electric machine 16 shown as MG1, and a second rotary electric machine 18 shown as MG2. The vehicle body 12 further has a motive power distribution mechanism 20 for distributing energy among these elements, a train of a plurality of gears 22, 24, 26, 28, 30, and 32 serving as a motive power transmitting mechanism, and a differential gear mechanism 34. The differential gear mechanism 34 is connected to drive wheels 36. The drive wheels 36 are left and right wheels, but in FIG. 1, one of the drive wheels is not shown. A drive circuit including an inverter and an electricity storage apparatus are connected to the first rotary electric machine 16 and the second rotary electric machine 18, but these elements are not shown in FIG. 1.

The engine 14 is an internal combustion engine forming the drive source of the hybrid vehicle 10. The engine 14 is formed from a piston/cylinder mechanism of 4 cylinders. Each cylinder structure has a cylinder having a tubular inner space, a piston 15 shown in FIG. 2 which slides along an inner wall of the cylinder, a fuel injection valve for injecting gasoline which is the fuel into the inside of the cylinder, an ignition plug which ignites compressed mixture gas of gasoline and air, an intake pipe for supplying air to the inside of the cylinder, and an exhaust pipe for exhausting exhaust gas from the inside of the cylinder to the outside.

The engine 14 supplies mixture gas of gasoline and air into the cylinder by control of the fuel injection valve and the intake valve, and repeats upward pressing of the piston 15, ignition of the mixture gas, explosion and expansion of the mixture gas, and downward pressing of the piston. With such a configuration, as shown in FIG. 2, a crank shaft 48 serving as a motive power shaft connected to the piston 15 is rotated and a torque is generated.

Operations of the fuel injection valve, the intake valve, the exhaust valve, or the like are correlated to a rotational operation of the crank shaft 48. For this purpose, as shown in FIG. 2, an engine cam mechanism 44 is provided adjacent to the engine 14. The crank shaft 48 is a shaft in which four crank mechanisms 47 are provided corresponding to pistons 15 of the 4-cylinder engine. A timing belt 46 is suspended between the crank shaft 48 and the engine cam mechanism 44, and with this configuration, the engine cam mechanism 44 operates in correlation with the rotational operation of the crankshaft 48.

Figure 3:
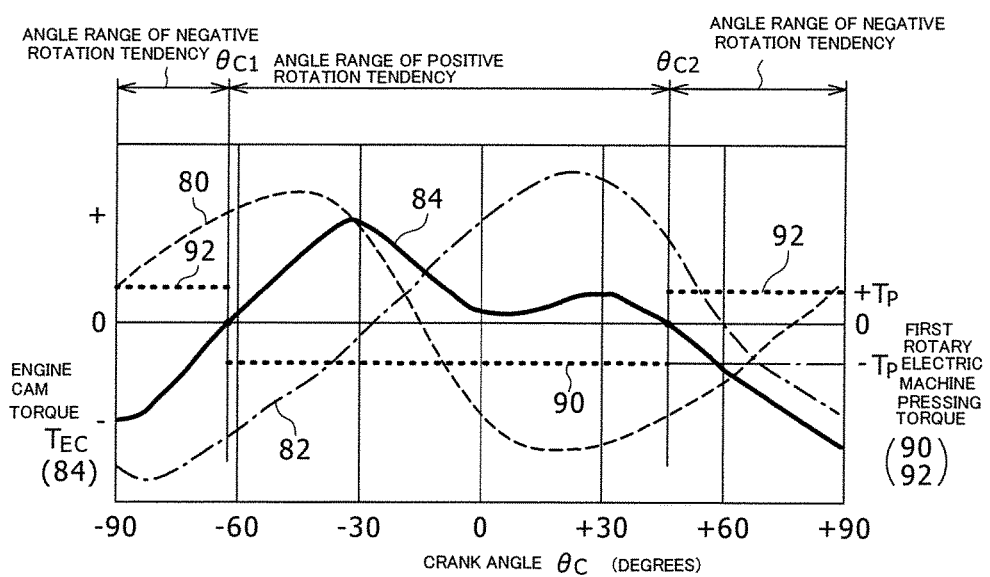
FIG. 3 is a diagram showing a relationship of engine cam torque with respect to a crank angle, used in a control apparatus of a hybrid vehicle according to an embodiment of the present disclosure.

FIG. 3 is a diagram showing a relationship between an engine cam torque $T_{EC}$ applied by a reaction force of the engine cam mechanism 44 to the crank shaft 48 and the crank angle $\theta_C$, in a stopped state of the engine 14. The horizontal axis represents a periodic rotational angle for each cylinder of the crankshaft 48. As the engine 14 is a 4-cylinder engine, the crank shaft 48 has one period corresponding to 4 cylinders with a rotational angle of 720 degrees, and has a periodic rotational angle of ±90 degrees for each cylinder. The vertical axis represents the magnitude of the engine cam torque $T_{EC}$. The engine cam torque $T_{EC}$ is given by a combined cam torque 84 in which a cam torque 80 on the exhaust valve side and a cam torque 82 on the intake valve side are combined.

The engine cam torque $T_{EC}$ acts as an external force with respect to the rotation of the crank shaft 48. If a direction in which the crank shaft 48 tends to be more easily rotated when the engine cam torque $T_{EC}$ has a positive value is called a direction of positive rotation tendency, the crank shaft 48 tends to be more easily rotated in a direction of negative rotation tendency when the engine cam torque $T_{EC}$ has a negative value.

In FIG. 3, in a region of the crank angle $\theta_C$ of $\theta_{C1}$ to $\theta_{C2}$, the combined cam torque 84 has a positive value. In this range of the crank angle, the crank shaft 48 and the engine output shaft 40 tend to be more easily rotated in the positive rotation direction, and thus, this range of the crank angle will hereinafter be referred to as "angle range of positive rotation direction tendency" and a range of the crank angle other than this range will be referred to as "angle range of negative rotation direction tendency". In the example configuration of FIG. 3, the region of the crank angle $\theta_C$ from $\theta_{C1}$ to $\theta_{C2}$ is the "angle range of positive rotation direction tendency", and a region of the crank angle of −90 degrees to $\theta_{C1}$ and a region of the crank angle from $\theta_{C2}$ to +90 degrees are the "angle ranges of negative rotation direction tendency".

A thick broken line shown in FIG. 3 represents a pressing torque applied by the first rotary electric machine 16 to the gear train. In the angle range of positive rotation direction tendency, $-T_P$ is applied as a pressing torque 90 in the negative rotation direction from the first rotary electric machine 16 to the gear train, and, in the angle range of negative rotation direction tendency, $+T_P$ is applied as a pressing torque 92 in the positive rotation direction from the first rotary electric machine 16 to the gear train. With such a configuration, generation of abnormal sound in the gear train caused by the engine cam torque is suppressed. Details will be described later with reference to FIG. 7 or the like.

Referring again to FIG. 1, the two rotary electric machines 16 and 18 forming the drive source are both motor generators (MGs) equipped on the hybrid vehicle 10, and are three-phase synchronous rotary electric machines which function as a motor when electric power is supplied from a drive circuit (not shown) and which have power generation function when the vehicle is driven by the engine 14 or during braking of the hybrid vehicle 10. If the two rotary electric machines 16 and 18 are distinguished as the first rotary electric machine 16 and the second rotary electric machine 18, the first rotary electric machine 16 primarily functions as a power generator driven by the engine 14, and the second rotary electric machine 18 primarily functions as a motor that drives the drive wheel 36.

The motive power distribution mechanism 20 provided between the engine 14 and the two rotary electric machines 16 and 18 is a mechanism having a function to suitably distribute between a portion used for power generation and a portion for driving the drive wheel 36, among the output of the engine 14, the input/output of the first rotary electric machine 16, and the output of the second rotary electric machine 18 according to a traveling state of the hybrid vehicle 10. The motive power distribution mechanism 20 is a planetary gear mechanism having a sun gear shown by S which is an outer-tooth gear, a ring gear shown by R which is an inner-tooth gear placed coaxially with the sun gear, a pinion gear which engages the sun gear and also engages the ring gear, and a carrier shown by C which rotatably and revolvably holds the pinion gear, and this planetary gear mechanism executes a differential operation using the sun gear S, the ring gear R, and the carrier C as rotation elements.

The crank shaft 48 of the engine 14 is connected to the ring gear R as the engine output shaft 40 through a flywheel damper 38. An output shaft of the first rotary electric machine 16 is connected to the sun gear S. An output shaft of the second rotary electric machine 18 is connected to the ring gear R through an output gear 24, a reduction gear 26, a counter driven gear 28, and a counter drive gear 22. In addition, the output shaft of the second rotary electric machine 18 is connected to the drive wheel 36 through the output gear 24, the reduction gear 26, a drive pinion gear 30, a differential ring gear 32, and the differential gear mechanism 34. These gears form the train of gears (gear train) 22, 24, 26, 28, 30, and 32. The output shaft 40 of the engine and the output shaft of the first rotary electric machine 16 are coaxially placed. The output shaft of the second rotary electric machine 18 is placed on a different axis than this axis. Such a method of placement is referred to as a multiple-axis type.

An oil pump 42 connected to the engine output shaft 40 is a pump that circulates and supplies lubricant oil to each of the engine 14, the first rotary electric machine 16, the second rotary electric machine 18, the plurality of the gears of the gear train 22, 24, 26, 28, 30, and 32, and the differential gear mechanism 34.

A rotational speed of the drive wheel 36 is detected by a suitable vehicle velocity detection means, and is transmitted to the control apparatus 60 as a vehicle velocity 50 through a signal line. A rotational position of the crank shaft 48 is detected by a suitable crank angle detection means, and is transmitted to the control apparatus 60 as a crank angle 52 through a signal line.

A shift lever 54 provided in a vehicle interior of the hybrid vehicle 10 is an operator for changing a shift position by a manipulation of the user. As the shift position, there are shown a drive position shown with D, a reverse position shown with R, a neutral position shown with N, and a parking position shown with P. Of these shift positions, in the neutral position, no torque is output from the drive source. A state of the shift position of the shift lever 54 is transmitted to the control apparatus 60 through a signal line. The brake 56 is an operator to stop rotation of the drive wheel 36 by a depression manipulation of the user. A manipulation state of the brake 56 is transmitted to the control apparatus 60 through a signal line. In addition to the above, in the vehicle interior, a steering wheel, an accelerator, or the like are also placed, but these elements are not shown in FIG. 1.

A drive mode 58 of the hybrid vehicle 10 has a total of 4 modes, including three modes related to an operation of the engine 14, namely, a cranking mode shown by CRK, an engine travel mode shown by DRV, and an engine stop process mode shown with STP, and an EV mode in which the engine 14 is stopped and the vehicle travels by driving the drive wheel 36 solely with the second rotary electric machine 18. One of four mode identification flags CRK, DRV, STP, and EV is transmitted to the control apparatus 60, and the control apparatus 60 identifies the drive mode according to the transmitted mode identification flag.

The control apparatus 60 controls an overall operation of the elements of the hybrid vehicle 10. The control apparatus 60 controls operations of the engine 14, the first rotary electric machine 16, the second rotary electric machine 18, the motive power distribution mechanism 20, or the like according to a travel state of the hybrid vehicle 10. Here, in particular, the control apparatus 60 executes control to suppress movement of the crank angle of the engine while suppressing generation of abnormal sound of the gear train. The control apparatus 60 may be formed from a computer suited to being equipped on a vehicle.

The control apparatus 60 includes an abnormal sound generation condition determination unit 62, a retention time determination unit 64 which determines whether or not a retention time, which is a period in which the abnormal sound generation condition continues to be satisfied, exceeds a predetermined value, a pressing torque setting unit 66 which sets a direction of a pressing torque, and a pressing processor 68 which executes a pressing process according to the contents of the setting. These functions may be realized by executing software in the control apparatus 60. Specifically, the control is realized by the control apparatus 60 executing an abnormal sound generation suppression program. Alternatively, some of the above-described functions may be realized by hardware.

A storage apparatus 70 is connected to the control apparatus 60 in a manner to allow communication, and is a memory which stores various programs including the abnormal sound generation suppression program executed by the control apparatus 60, temporary data, or the like. In addition, a cam torque relationship file 72 showing a relationship between the engine cam torque $T_{EC}$ and the crank angle $\theta_C$ described above with reference to FIG. 3 is also stored.

Figure 4:
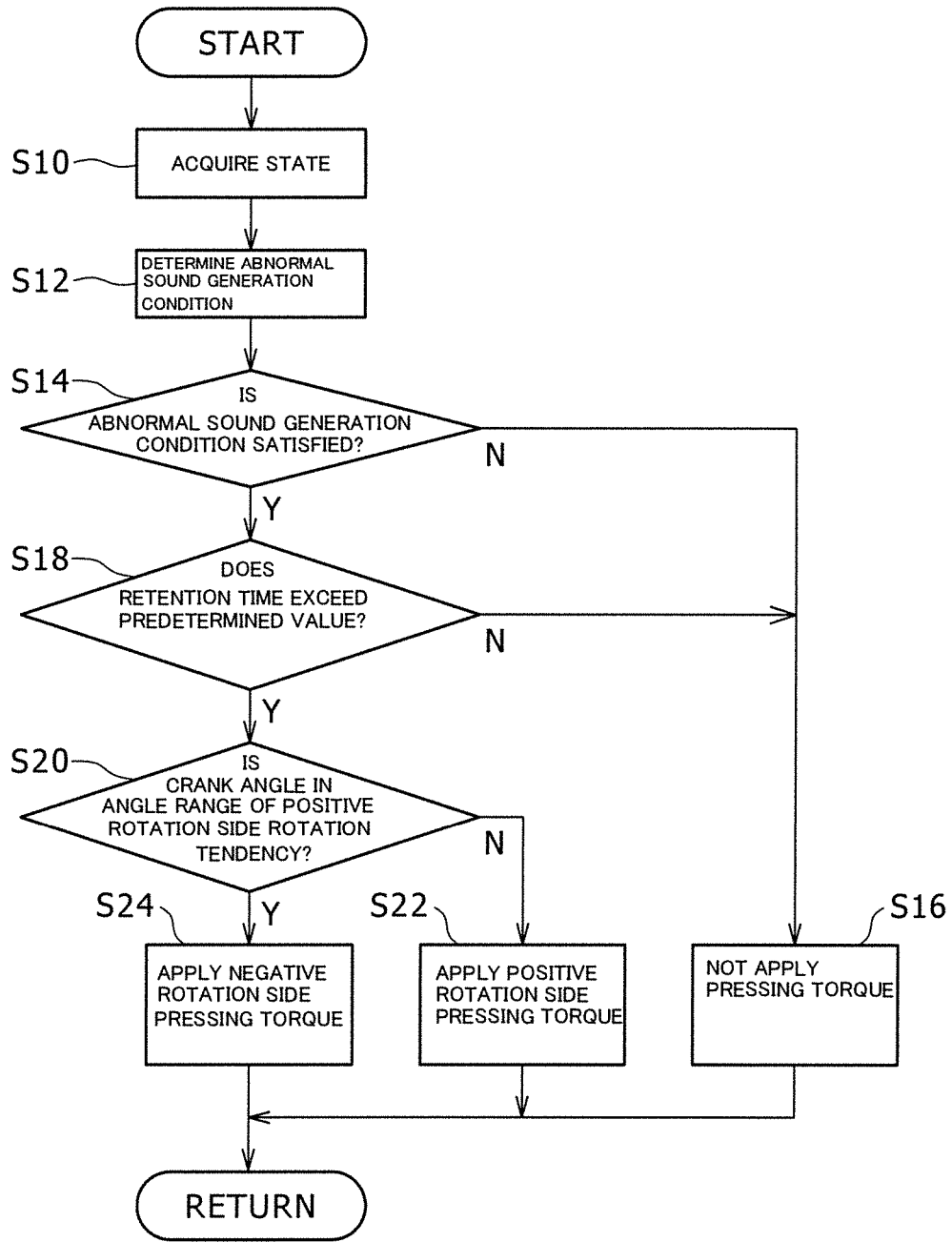
FIG. 4 is a flowchart showing a procedure for suppressing movement of a crank angle while suppressing generation of abnormal sound in a control apparatus of a hybrid vehicle according to an embodiment of the present disclosure.

An operation of such a structure, in particular, the details of the functions of the control apparatus 60, will now be described in detail with reference to FIG. 4 and subsequent diagrams. FIG. 4 is a flowchart showing a procedure for suppressing movement of the crank angle while suppressing the generation of the abnormal sound. Each step corresponds to each processing step of the abnormal sound generation suppression program.

When the hybrid vehicle 10 is started up, the elements are initialized, and the abnormal sound generation suppression program is started up in the control apparatus 60. States of the elements are acquired (S10). The acquired states include the vehicle velocity 50, the crank angle 52, the shift position of the shift lever 54, the manipulation state of the brake 56, the drive mode 58, measured time data of various timers to be described later, or the like, described above as information transmitted to the control apparatus 60 with reference to FIG. 1.

After the states are acquired, an abnormal sound generation condition determination is executed based on the acquired states (S12). The processing step is executed by the function of the abnormal sound generation condition determination unit 62 of the control apparatus 60. The abnormal sound generation condition determination is executed based on determinations of four states.

A first state determination is determination of whether or not the hybrid vehicle 10 is traveling. When the vehicle is not traveling, the vehicle is stopped. Thus, as the first state determination, it is determined whether the hybrid vehicle 10 is traveling or stopped. When it is determined as a result of the abnormal sound generation condition determination that the abnormal sound determination condition is satisfied, as will be described later, a pressing torque for reducing rattling of the gear train is output from the first rotary electric machine 16. When the torque is generated, the fuel consumption characteristic is worsened correspondingly. When the hybrid vehicle 10 is stopped and does not generate a torque, it can be considered that the possibility of generation of the abnormal sound of the gear train is also low, and thus, this condition may be excluded from the abnormal sound generation condition. When the result of the first state determination is negative and the hybrid vehicle 10 is stopped, it is determined that the abnormal sound generation condition is not satisfied.

Figure 5A:
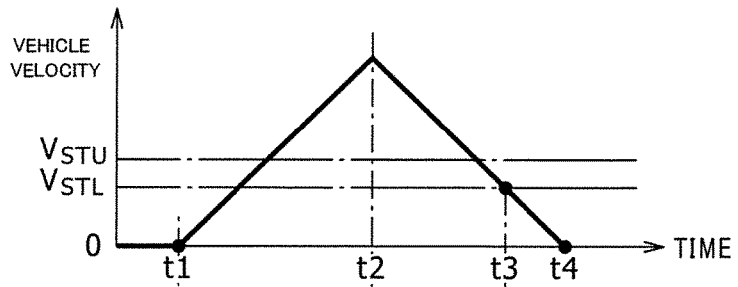
FIG. 5A is a diagram showing, with regard to an abnormal sound generation condition, contents of determination of a state of traveling and not stopped in a control apparatus of a hybrid vehicle according to an embodiment of the present disclosure, and showing a change with respect to time of a vehicle velocity.
Figure 5B:
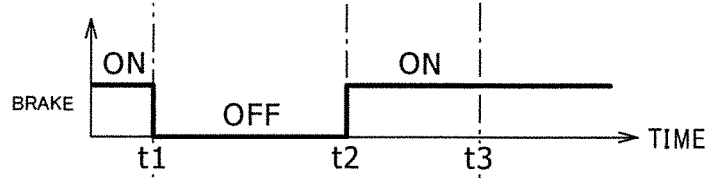
FIG. 5B is a diagram showing, with regard to an abnormal sound generation condition, contents of determination of a state of traveling and not stopped in a control apparatus of a hybrid vehicle according to an embodiment of the present disclosure, and showing elapsed time of brake manipulation.
Figure 5C:
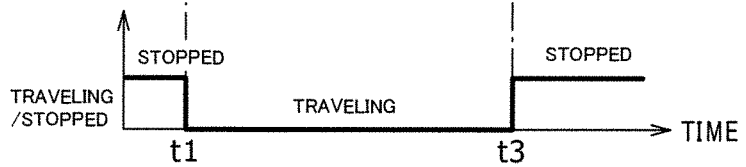
FIG. 5C is a diagram showing, with regard to an abnormal sound generation condition, contents of determination of a state of traveling and not stopped in a control apparatus of a hybrid vehicle according to an embodiment of the present disclosure, and distinguishing the traveling and stopped states.

The determination of whether the hybrid vehicle 10 is traveling or stopped can be made by determining whether or not the brake 56 is depressed. However, when the depressing of the brake 56 is released because the vehicle has stopped, there may be a case where the vehicle starts to travel. An example of such a case is a case where the hybrid vehicle 10 is on a downhill road. FIGS. 5A-5C are diagrams showing the contents of determination of whether the vehicle is "traveling" or "stopped" in such a case. Horizontal axes of the drawings represent time, a vertical axis of FIG. 5A represents a data value of the vehicle velocity 50, a vertical axis of FIG. 5B represents the state of the brake 56 with the depressing of the brake as ON and the release of the brake as OFF, and a vertical axis of FIG. 5C represents a traveling state or a stopped state.

Up to time t1, the brake 56 is in the ON state and the vehicle velocity is 0, and the state of the hybrid vehicle 10 is "stopped". When the brake 56 is set to the OFF state at time t1, for example, on a downhill road or the like, the vehicle velocity starts to be increased, and thus, the hybrid vehicle 10 is set to "traveling", and not "stopped". At time t2, the user notices that the vehicle has started to travel, and again sets the brake 56 to the ON state. The vehicle velocity is reduced from time t2, but at time t3 prior to time t4 where vehicle velocity becomes 0, and when the vehicle velocity is reduced to a stop determination vehicle velocity $V_{STL}$ which is defined in advance, the state is changed from "traveling" to "stopped". In this example configuration, the state of the hybrid vehicle 10 is "traveling" between time t1 and time t3, and is "stopped" for other periods. In this manner, the period when the state is determined as "traveling" when the hybrid vehicle 10 moves by itself is longer than a release period of the brake 56 and shorter than a period in which the vehicle velocity is not 0. With such a configuration, the condition of "traveling" as the abnormal sound generation condition can be suitably set. $V_{STU}$ in FIG. 5 is a vehicle velocity at which, after the vehicle velocity has increased at the release of brake, the vehicle is clearly determined as traveling. The predefined stop determination vehicle velocity $V_{STL}$ is a vehicle velocity at which, after the vehicle velocity is reduced, the state is determined as stopped. The stop determination vehicle velocity $V_{STL}$ is lower than $V_{STU}$.

When the first state determination results in positive, a second state determination is executed for the abnormal sound generation condition. The second state determination is a determination of whether or not the hybrid vehicle 10 is in a torque generating state. When it is determined as a result of the abnormal sound generation condition determination that the abnormal sound generation condition is satisfied, a pressing torque for reducing rattling in the gear train is output from the first rotary electric machine 16. When the hybrid vehicle 10 is not in the torque generating state, the first rotary electric machine 16 cannot output the pressing torque. In consideration of this, the time when the vehicle is not in the torque generating state may be excluded from the abnormal sound generation condition. In the hybrid vehicle 10, when the shift position is in the neutral position, no torque is generated. When the shift position is at other shift positions, the torque can be generated. Therefore, when the shift position is at the neutral position, the second state determination results in negative, and it is determined that the abnormal sound generation condition is not satisfied.

When both the first state determination and the second state determination result in positive, a third state determination is executed for the abnormal sound generation condition. The third state determination is a determination of whether or not the drive mode of the hybrid vehicle 10 is the EV mode. As described above with reference to FIG. 1, of the drive modes, CRK, the DRV, and STP are drive modes related to the engine 14, and EV mode is a drive mode in which the engine 14 is stopped and the hybrid vehicle 10 travels solely using the second rotary electric machine 18. When the hybrid vehicle 10 travels with the engine 14, the abnormal sound of the gear train is not too disturbing for the user because of the noise of the engine 14. Therefore, when the engine 14 is operating, the third state determination results in negative, and it is determined that the abnormal sound generation condition is not satisfied.

When all of the first through third state determinations result in positive, a fourth state determination is executed for the abnormal sound generation condition. The fourth state determination is a determination of whether or not the vehicle velocity of the hybrid vehicle 10 is low, and is lower than or equal to a predetermined velocity. When the vehicle velocity is high in the EV mode, the sun gear S to which the first rotary electric machine 16 is connected rotates at a high speed. Thus, even if the abnormal sound is generated in the gear train, the engine output shaft 40 does not rotate in a certain direction. When the sun gear S is at a low speed, the sun gear slowly presses the gear train, and thus, the engine output shaft 40 is rotated and the crank angle of the crankshaft 48 may consequently be moved. Based on this, when the vehicle velocity of the hybrid vehicle 10 exceeds a predetermined velocity and is in the high velocity traveling state, the fourth state determination results in negative, and it is determined that the abnormal sound generation condition is not satisfied. With regard to the vehicle velocity lower than or equal to the predetermined velocity, the velocity may be determined based on a vehicle velocity corresponding to a rotation number of the sun gear S at which the sun gear S presses and displaces the gear train.

Figure 6:
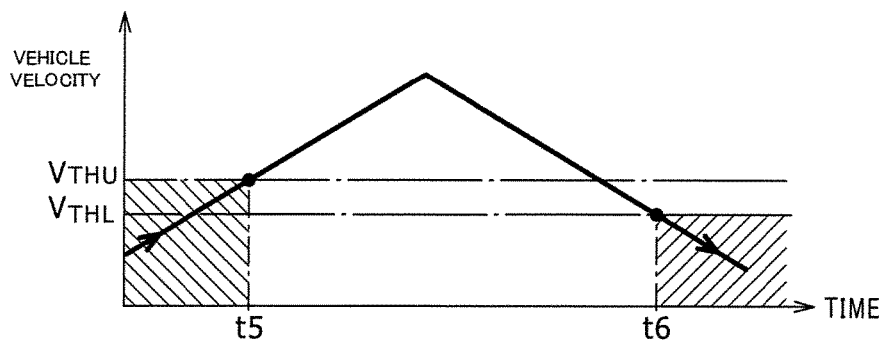
FIG. 6 is a diagram showing, with regard to an abnormal sound generation condition, ranges of vehicle velocity of lower than or equal to a predetermined velocity in a control apparatus of a hybrid vehicle according to an embodiment of the present disclosure.

The predetermined velocity used for the low velocity determination may have a hysteresis characteristic having different values between a case where the vehicle velocity is being increased (acceleration) and a case where the vehicle velocity is being reduced (deceleration). FIG. 6 shows the low velocity states of lower than or equal to a predetermined velocity when the hybrid vehicle 10 is accelerating and when the hybrid vehicle 10 is decelerating. The horizontal axis represents time and the vertical axis represents the vehicle velocity. The vehicle velocity is a data value of the vehicle velocity 50 transmitted from the vehicle velocity detection means described above with reference to FIG. 1. $V_{THU}$ on the vertical axis represents a predetermined acceleration velocity at the time of acceleration, and $V_{THL}$ represents a predetermined deceleration velocity at the time of deceleration. The velocities are in a relationship of $V_{THL} < V_{THU}$. In FIG. 6, when the hybrid vehicle 10 is accelerated and the velocity becomes greater than or equal to the predetermined acceleration velocity $V_{THU}$ at time t5, and the hybrid vehicle 10 is further accelerated to the maximum velocity and then decelerated and the velocity becomes lower than or equal to the predetermined deceleration velocity $V_{THL}$ at time t6, time regions shown with slanted lines before time t5 and after t6 are the low-velocity region of lower than or equal to the predetermined velocity. In this manner, by providing a hysteresis characteristic to the predetermined velocity used for determination of the low velocity, it is possible to accurately determine the fourth state.

When all of the four state determinations are positive, it is determined that the abnormal sound generation condition is satisfied. When any one of the four state determinations results in negative, it is determined that the abnormal sound generation condition is not satisfied. In the above description, the state determinations are executed in the order of first, second, third, and fourth state determinations. Alternatively, the order of determinations may be exchanged. Alternatively, the four states forming the abnormal sound generation condition may be acquired in the state acquisition of S10 of FIG. 4, and then, the determination of whether or not the abnormal sound generation condition is satisfied may be executed based on an AND logic table.

The abnormal sound generation condition determination of S12 has been described. With reference again to FIG. 4, when the abnormal sound generation condition determination is completed, it is determined whether or not the abnormal sound generation condition is satisfied as a result of the determination (S14). When the determination of S14 is negative and the abnormal sound generation condition is not satisfied, the pressing torque is not applied from the first rotary electric machine 16 to the gear train (S16). The pressing torque is applied for suppressing the abnormal sound generation of the gear train, and thus, when the abnormal sound generation condition is not satisfied, it is not necessary to apply the pressing torque, and the pressing torque is set to 0 (Nm).

When the determination of S14 is positive and the abnormal sound generation condition is satisfied, the pressing torque is applied from the first rotary electric machine 16 to the gear train. The setting of the pressing torque to be applied differs depending on the state of the hybrid vehicle 10. In FIG. 4, the state of the hybrid vehicle 10 is classified into 3 different categories, and different setting of the pressing torque is executed for each of the categories.

When the determination of S14 is positive, a retention time, which is a period in which the abnormal sound generation condition continues to be satisfied, is measured by the retention time timer. Then, it is determined whether or not the retention time measured by the retention time timer exceeds a predetermined value $t_{STO}$ which is defined in advance (S18). When the retention time is short, the user is not too disturbed by the generation of the abnormal sound.

When the retention time is within the predetermined value $t_{STO}$, determination in S18 results in negative. The predetermined value $t_{STO}$ can be set according to the size of the rattling sound or the like, and as an example, $t_{STO}$=few seconds. When the determination of S18 is negative, the pressing torque is not applied from the first rotary electric machine 16 to the gear train, similar to the case where the abnormal sound generation condition is not satisfied (S16). These processing steps are executed by the functions of the retention time determination unit 64 and the pressing torque setting unit 66 of the control apparatus 60.

When the retention time exceeds the predetermined value $t_{STO}$ the determination of S18 becomes positive. The control apparatus 60 acquires the crank angle 52 through the crank angle detection means, searches the cam torque relationship file using the acquired crank angle 52 as a search key, and determines whether or not the crank angle 52 is in the angle range of positive rotation direction tendency (S20).

When the determination of S20 is positive, the pressing torque in the negative rotation direction is applied from the first rotary electric machine 16 to the gear train, to suppress positive rotation of the engine output shaft 40 (S24). In FIG. 3, the pressing torque 90 of the first rotary electric machine 16 is $-T_P$ which is the pressing torque in the negative rotation side. When the determination of S20 is negative, because the crank angle 52 is in the angle range of the negative rotation direction tendency, the pressing torque in the positive rotation direction is applied from the first rotary electric machine 16 to the gear train, to suppress negative rotation of the engine output shaft 40 (S22). In FIG. 3, the pressing torque 92 of the first rotary electric machine 16 is $+T_P$ which is the pressing torque in the positive rotation direction. These processing steps are executed by functions of the pressing torque setting unit 66 and the pressing processor 68 of the control apparatus 60.

The pressing torque is set at a size which is greater than a fluctuation range of the torque of the first rotary electric machine 16 and not exceeding the frictional torque of the engine 14 when the direction of the engine cam torque is reversed and the engine cam torque is added. As an example, as the pressing torque in the positive rotation direction, $+T_P$ may be set to +2 Nm~+4 Nm, and, as the pressing torque in the negative rotation direction, $-T_P$ may be set to -2 Nm~-4 Nm.

FIGS. 7A-7G are diagrams showing the procedure of FIG. 4 as timing charts of the elements. Horizontal axes of FIGS. 7A-7G represent time, and vertical axes of FIGS. 7A-7G represent changes with respect to time of the elements related to the abnormal sound generation condition for FIGS. 7A-7D. FIG. 7A is a diagram showing a change with respect to time of whether the vehicle is traveling or is stopped for the abnormal sound generation condition, FIG. 7B is a diagram showing a change with respect to time of the shift position for the abnormal sound generation condition, FIG. 7C is a diagram showing a change with respect to time of the drive mode for the abnormal sound generation condition, and FIG. 7D is a diagram showing a change with respect to time of the vehicle velocity for the abnormal sound generation condition. FIG. 7E is a diagram showing a change with respect to time of the measurement value of the retention time timer which measures a period in which the abnormal sound generation condition continues to be satisfied, FIG. 7F is a diagram showing a change with respect to time of the crank angle, and FIG. 7G is a diagram showing a change with respect to time of the MG1 torque which is the output torque of the first rotary electric machine.

In a period from time t=0 to time t20, the vehicle is stopped (FIG. 7A), the shift position is at the neutral position and no torque is generated (FIG. 7B), the drive mode is a drive mode of the engine 14 and is not the EV mode (FIG. 7C), and vehicle velocity is 0 (FIG. 7D). Therefore, at least one of the four state determinations of the abnormal sound generation condition results in negative, and as the retention time timer does not start measurement (FIG. 7E), the retention time is 0. The crank angle (FIG. 7F) and the output torque of the first rotary electric machine 16 (FIG. 7G) change according to the drive state of the engine 14.

At time t20, the drive mode is changed from the operation mode of the engine 14 to the EV mode (FIG. 7C), but the hybrid vehicle 10 is stopped (FIG. 7A) and the vehicle velocity is 0 (FIG. 7D). Then, the shift position is changed from the neutral position to another position (FIG. 7B), and a torque is output from the drive source. In this state, at least one of the four state determinations of the abnormal sound generation condition results in negative, and as the retention time timer does not start measurement (FIG. 7E), the retention time is 0. In this state, the engine 14 is stopped, and the crank angle (FIG. 7F) is in, for example, a positive rotation bias angle range. The first rotary electric machine 16 does not output the pressing torque (FIG. 7G).

At time t21, the hybrid vehicle 10 starts to move (FIG. 7D) and the vehicle velocity is increased from 0, and the vehicle is set to the traveling state (FIG. 7A). The drive mode is already set to the EV mode (FIG. 7C), and the shift position is already changed to the state where the torque is output from the drive source (FIG. 7B). Thus, all of the four state determinations of the abnormal sound generation condition result in positive, and it is determined that "the abnormal sound generation condition is satisfied". The retention time timer (FIG. 7E) starts measurement of time from t21 when "the abnormal sound generation condition is satisfied", the measured period is increased during the period when the state of "the abnormal sound generation condition is satisfied" continues, and at time t22, the retention time becomes the predetermined value $t_{STO}$.

Therefore, in the period from time t0 to time t22, the determination in S18 of FIG. 4 results in negative, and regardless of the crank angle (FIG. 7F), the pressing torque is not applied from the first rotary electric machine 16 to the gear train (FIG. 7G), and the output of the first rotary electric machine 16 is set to 0 (Nm).

Beyond time t22, the retention time exceeds the predetermined value $t_{STO}$, and the determination in S18 of FIG. 4 results in positive. Here, because the crank angle (FIG. 7F) is in the positive rotation bias angle range, the determination of S20 of FIG. 4 results in positive, and the first rotary electric machine 16 outputs $-T_P$ as the pressing torque in the negative rotation direction.

Time t23 is a time where the vehicle velocity (FIG. 7D) is increased and exceeds a predetermined acceleration velocity $V_{THU}$. At this time, the "low velocity lower than or equal to the predetermined velocity" which is one of the abnormal sound generation condition becomes not satisfied. Thus, it is determined that "the abnormal sound generation condition is not satisfied". As the retention time timer (FIG. 7E) measures the retention time, which is a period in which the abnormal sound generation condition continues to be satisfied, the timer is reset at time t23. With this process, retention time becomes 0 and the determination of S18 of FIG. 4 results in negative. Thus, regardless of the crank angle (FIG. 7F), the pressing torque is not applied from the first rotary electric machine 16 to the gear train (FIG. 7G), and the output of the first rotary electric machine 16 is set to a pressing torque of 0 (Nm).

Then, the vehicle velocity is further increased and reaches a maximum velocity, and then the vehicle is decelerated. At time t24, the vehicle velocity becomes lower than or equal to the predetermined deceleration velocity $V_{THL}$, and all of the four state determinations for the abnormal sound generation condition again result in positive, and it is determined that "the abnormal sound generation condition is satisfied". The retention time timer (FIG. 7E) starts measuring time from t24 when it is determined that "the abnormal sound generation condition is satisfied", the measurement continues during the period when the abnormal sound generate condition continues to be satisfied, and at time t25, the retention time reaches the predetermined value $t_{STO}$.

Therefore, in the period from time t23 to time t25, the determination of S18 in FIG. 4 results in negative, and regardless of the crank angle (FIG. 7F), the pressing torque is not applied from the first rotary electric machine 16 to the gear train (FIG. 7G), and the output of the first rotary electric machine 16 is set to the pressing torque of 0 (Nm).

Beyond time t25, the retention time exceeds the predetermined value $t_{STO}$, and the determination of S18 of FIG. 4 results in positive. As the crank angle (FIG. 7F) is in the positive rotation bias angle range, the determination of S20 of FIG. 4 results in positive, and the first rotary electric machine 16 outputs $-T_P$ as the pressing torque in the negative rotation side (FIG. 7G).

When the vehicle velocity is further reduced and becomes 0 (FIG. 7E) at time t26, the vehicle is stopped (FIG. 7A), and the condition of "traveling" which is one condition for the abnormal sound generation condition is not satisfied. Thus, it is determined that "the abnormal sound generation condition is not satisfied". As the retention time timer (FIG. 7E) measures the retention time, which is the period in which the abnormal sound generation condition continues to be satisfied, the timer is reset at time t26. With this process, the retention time becomes 0, the determination of S18 of FIG. 4 results in negative, and regardless of the crank angle (FIG. 7F), no pressing torque is applied from the first rotary electric machine 16 to the gear train (FIG. 7G), and the output of the first rotary electric machine 16 is set to a pressing torque of 0 (Nm).

In the above description, it is described that the crank angle in the state where the engine 14 is stopped is in the positive rotation bias angle range, but this is merely exemplary for the purpose of the description, and alternatively, the crank angle in the state where the engine 14 is stopped may be in a negative rotation bias angle range.

If the abnormal sound generation is within a short period, the user would not notice. According to the above-described structure, the pressing torque of a predefined size is applied, from the first rotary electric machine to the gear train of the transmission mechanism, in the direction to suppress the engine cam torque which may rotate the engine output shaft during the period in which the engine is stopped, only when the retention time, in which the drive state of the hybrid vehicle continues to satisfy the abnormal sound generation condition of the gear train, exceeds a predetermined value. The crank angle of the engine does not move unless the pressing torque is applied. With such a configuration, the movement or change of the crank angle of the engine can be suppressed while suppressing generation of the abnormal sound of the gear train which is uncomfortable for the user.

When the abnormal sound generation continues beyond the retention time, the pressing torque is applied from the first rotary electric machine to the gear train, and depending on the manner of application, the crank angle of the engine may move. According to the above-described configuration, when the crank angle during the period when the engine is stopped is within the angle range of positive rotation direction tendency, $-T_P$ is applied as the pressing torque in the direction to rotate the engine output shaft 40 to the negative rotation side, and when the crank angle is in the angle range of negative rotation direction tendency, $+T_P$ is applied as the pressing torque in the direction to rotate the engine output shaft 40 to the positive rotation side. With such a configuration, the external force applied on the engine output shaft can be reduced according to the crank angle during the period when the engine is stopped, and the movement or change of the crank angle of the engine can be suppressed while suppressing generation of abnormal sound of the gear train.

What is claimed is:

1. A control apparatus of a hybrid vehicle in which an engine, a first rotary electric machine, and a second rotary electric machine are connected to each other through a transmission mechanism including a gear train, the control apparatus configured to:
- determine whether or not a drive state of the hybrid vehicle satisfies an abnormal sound generation condition of the gear train;
- execute a process to not apply a pressing torque for reducing rattling from the first rotary electric machine to the gear train of the transmission mechanism when the abnormal sound generation condition is not satisfied,
- determine whether or not a retention time, which is a period in which the abnormal sound generation condition continues to be satisfied, exceeds a predetermined value when the abnormal sound generation condition is satisfied,
- execute the process to not apply the pressing torque when the abnormal sound generation condition is satisfied and the retention time does not exceed the predetermined value, and
- execute a pressing process to apply the pressing torque when the abnormal sound generation condition is satisfied and the retention time exceeds the predetermined value.

2. The control apparatus of the hybrid vehicle according to claim 1, wherein
the pressing torque is a torque in a direction to suppress an engine cam torque which may rotate an engine output shaft during a period in which the engine is stopped.

3. The control apparatus of the hybrid vehicle according to claim 2, wherein
the abnormal sound generation condition includes:
a condition that a drive mode is an EV mode in which the engine is stopped and the vehicle travels solely using the second rotary electric machine;
a condition that a vehicle velocity of the hybrid vehicle is lower than or equal to a predetermined vehicle velocity;
a condition that the hybrid vehicle is traveling and is not stopped; and
a condition that a shift position is a shift position at which a torque is output to a drive wheel.

4. The control apparatus of the hybrid vehicle according to claim 3, wherein
the vehicle velocity lower than or equal to the predetermined vehicle velocity is a vehicle velocity lower than or equal to a predetermined acceleration velocity when the hybrid vehicle is accelerating, and is a vehicle velocity lower than or equal to a predetermined deceleration velocity which is lower than the predetermined acceleration velocity when the hybrid vehicle is decelerating.

5. The control apparatus of the hybrid vehicle according to claim 1, wherein
the abnormal sound generation condition includes:
a condition that a drive mode is an EV mode in which the engine is stopped and the vehicle travels solely using the second rotary electric machine;
a condition that a vehicle velocity of the hybrid vehicle is lower than or equal to a predetermined velocity;
a condition that the hybrid vehicle is traveling and is not stopped; and
a condition that a shift position is a shift position at which a torque is output to a drive wheel.

6. The control apparatus of the hybrid vehicle according to claim 5, wherein
the vehicle velocity lower than or equal to the predetermined velocity is a vehicle velocity lower than or equal to a predetermined acceleration velocity when the hybrid vehicle is accelerating, and is a vehicle velocity lower than or equal to a predetermined deceleration velocity which is lower than the predetermined acceleration velocity when the hybrid vehicle is decelerating.

* * * * *